United States Patent Office.

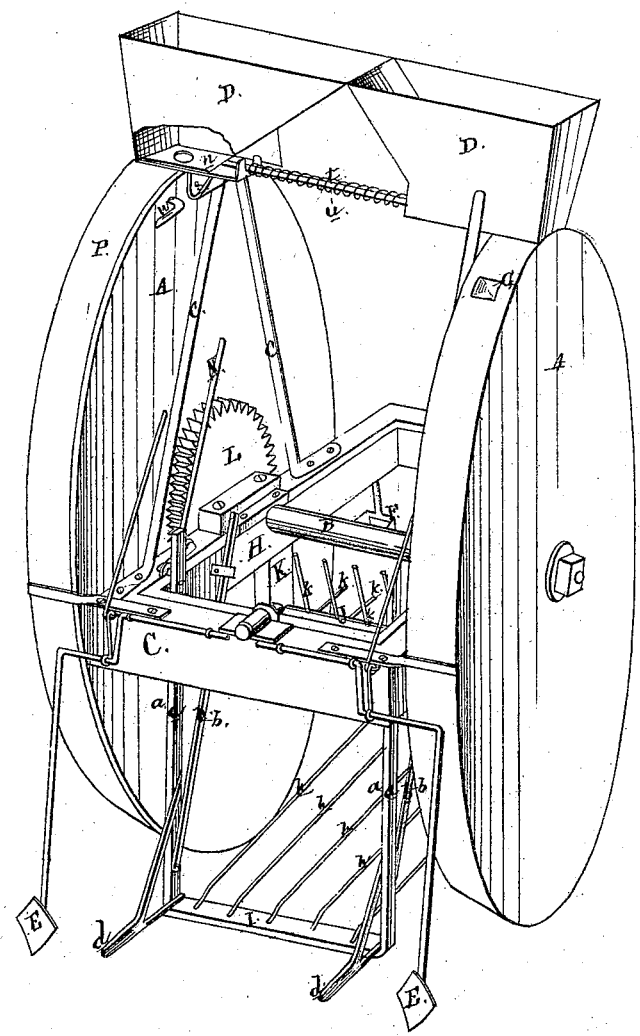

JAMES CARROLL WALKER, OF FARMINGTON, MICHIGAN.

Letters Patent No. 112,870, dated March 21, 1871.

IMPROVEMENT IN COMBINED POTATO-PLANTERS AND DIGGERS.

The Schedule referred to in these Letters Patent and making part of the same.

*To whom it may concern:*

Be it known that I, JAMES CARROLL WALKER, of Farmington, in the county of Oakland and State of Michigan, have invented a new and useful Improvement in a Combined Potato-Digger and Planter; and I do declare that the following is a true and accurate description thereof, reference being had to the accompanying drawing and to the letters of reference marked thereon and being a part of this specification.

The nature of this invention relates to an improvement in that class of agricultural implements employed in digging potatoes, and combining the same with the necessary devices to make the implement a potato-planter as well as digger.

Figure 1 is a perspective view of my improvement with the shield omitted from one of the wheels.

The invention consists in the combination, in one implement, of devices of peculiar construction and arrangement for digging and for planting potatoes, in such a manner that the implement may be used for either purpose without removing any of its parts.

In the accompanying drawing—

A represents two traction-wheels, secured to and rotating with the axle B.

C is a suitable frame, supported by the axle, and to which is secured, in any convenient manner, the seed-hoppers D, furrow-opening plows E, and covering-hoes F, the plows and hoes being pivoted to the frame, the plows to the front end, and the hoes to the rear end of the same, and provided with suitable levers, by means of which they may be elevated when not required in use.

H is another frame, supported by the axle, and is smaller than the frame C, within which it operates.

To this frame is suspended, by means of the standards *a* and braces *b*, the apparatus for digging the potatoes, which is constructed as follows:

I is a blade, secured to the lower end of the standard *a*, and is intended to pass under the hill to be dug.

Projecting forward from each end of this blade are the fingers *d*, which are intended to gather in the vines that may have fallen, to prevent their clogging the apparatus.

Secured to the rear side of the blade is the series of fingers *h*, projecting upward and backward to receive the hill, and allow the earth to fall through the intervals between the wire teeth or fingers.

J is a shaft, journaled at each end to the hangers K, which are suspended from and attached to the frame C.

This shaft receives a rotary motion from the gear-wheel L, which is secured to and rotates with the wheel A, and communicates its motion through intermediate gears M, not shown.

This shaft is provided with four or more series of fingers, *k*, projecting at right angles from its axis.

In the rotation of the shaft its fingers pass between the intervals between the fingers *h* and throw the potatoes to the rear of the apparatus.

N is a lever, by means of which the frame H is tilted, thus throwing the digging apparatus above the ground when not in use.

D are hoppers to receive the seed to be planted, which are supported by proper standards upon the frame C at a suitable height therefrom, so that they will project over the wheels.

The bottoms of these hoppers incline downward and outward, and near their ends they are provided with apertures through their bottoms, through which, at the proper time, the seed will pass.

These openings are fitted with slides *n*, to which are attached the lugs *s*, which impinge against the coil-springs *t* upon the rod *u*, and which compel the slides to close the openings in the bottom of the hoppers, except when, in the rotation of the wheels A, the stop *w*, which is secured to the inner face of said wheels, comes into contact with the lug *s* and forces it back, thereby withdrawing the slides and allowing the seed to pass through.

In the periphery of the wheels A are recesses G, to receive the seed from the openings in the hoppers.

These recesses, of which there may be as many as desired, are coincident with the stops *w*, so that when the openings in the hopper are uncovered said recesses will be in place to receive the seed.

A shield, P, which conforms to the shape and size of the wheel, is secured in front of said wheel in any convenient manner, so that it will retain the seed in the recesses until the same, in the rotation of the wheel, shall be presented at a point immediately below the axle, when the seed will be dropped into the furrow made by the plows E and covered by the hoes F.

What I claim as my invention, and desire to secure by Letters Patent, is—

The combination of the wheels A, the axle B, and the frame C, with the devices for planting and for digging potatoes, substantially as described and shown.

JAMES CARROLL WALKER.

Witnesses:
SAMUEL J. SPRAY,
FRANK DUNLAP.